Aug. 10, 1948.                    R. S. HENRY                    2,446,587
                                  SLUDGE TRAP
                              Filed June 11, 1946

INVENTOR.
Robert S. Henry
BY

Patented Aug. 10, 1948

2,446,587

UNITED STATES PATENT OFFICE 2,446,587

SLUDGE TRAP

Robert S. Henry, New Hartford, N. Y.

Application June 11, 1946, Serial No. 675,914

2 Claims. (Cl. 210—57)

This invention relates to a sludge trap, and more particularly to a trap for removing foreign matter from hydraulic circulating systems.

An important object of the invention is to provide a sludge trap embodying means for emptying and cleaning the same without loss of fluid from the circulating system in which the trap is incorporated.

Another object is the provision of a sludge trap having a shut-off valve by which the trap can be shut off from the circulating system for purposes of cleaning or repairing the trap.

A further object is to provide a means incorporated in a sludge trap whereby fluid may be drained off from a circulating system.

A still further object is the provision of air-venting means in a sludge trap of a circulating system.

The above and other objects are accomplished by the hereinafter described sludge trap structure which is particularly applicable to automobile heater or cooling systems, domestic hot water heater circulating systems, or other hydraulic piping systems in which foreign matter is likely to be present in the circulating medium.

The invention comprises briefly a trap for insertion in the piping of a circulating system and having a removable container for holding entrapped foreign matter. A sleeve valve is embodied in the trap for shutting the same off from the circulating system in order to remove the container for cleaning or repair. Air venting means is provided for permitting removal of air from the container upon replacing the same in the circulating system, and a drain valve is also provided for draining off circulating medium from the system.

The invention will best be understood from the following description of the same, taken in conjunction with the annexed drawings, wherein.

Figure 1:
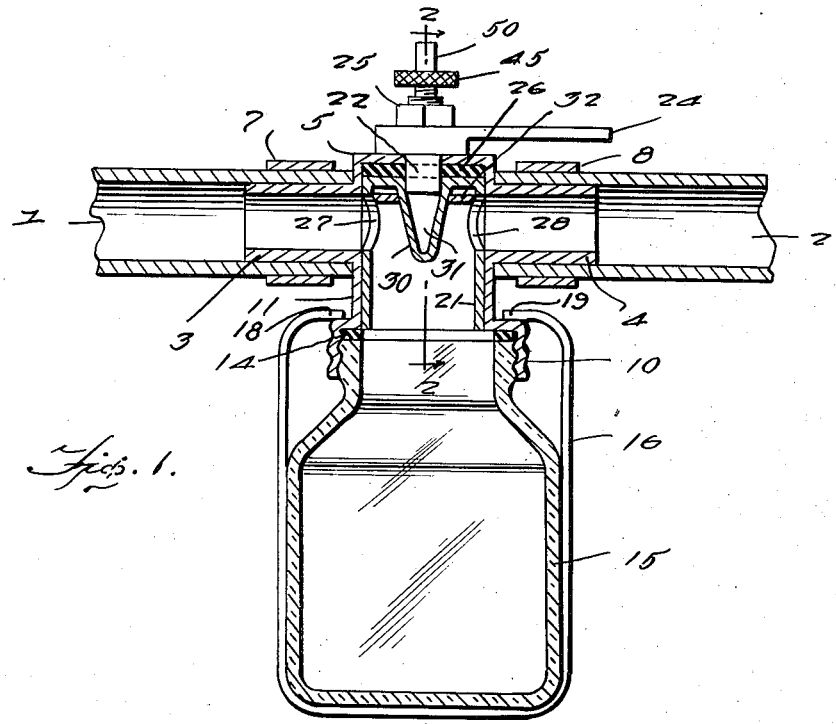
Figure 1 is a vertical cross-sectional view of the trap inserted in a circulating system.

Referring in greater detail to the drawings, 1 and 2 indicate portions of a pipe forming a part of a fluid circulating system. The circulatng pipe may take the form of a hose connection of an automobile heater or cooling system, in which the sludge trap is connected by means of the tubular extensions 3 and 4 on the body portion 5 of the trap. Suitable means, such as the coupling rings 7 and 8 of conventional design are provided to secure the ends of the pipe 1 and 2 on the extensions 3 and 4.

The body 5 of the trap has a screw-threaded cap portion 10 from which extends a tubular body portion 11, closed at the top.

A washer 14 of suitable sealing material, such as rubber, is fitted within the screw-threaded cap portion 10 and this cap portion is threaded onto a sludge chamber or receptacle 15 which may take the form of a jar of glass, plastic or other suitable material. A wire clip 16 extends beneath the bottom of receptacle 15 and has its ends 18 and 19 turned inwardly to rest upon the cap 10 to assist in retaining the receptacle 15 in place.

Within the tubular body 11 is positioned a rotary sleeve valve 21 closed at the top, open at its bottom and having a stem 22 extending through its top wall and the top of the tubular body 11. The stem 22 is furnished with a valve lever 24 held in place by a nut 25. The sleeve valve 21 bears at the top upon a gasket 26 within the tubular body 11. Diametrically opposite ports 27 and 28 are formed in the sleeve, which ports may be brought into register with the extensions 3 and 4 of the tubular body 11 in the open position of the valve. The sleeve valve is formed at its upper end with an inwardly-directed portion comprising a hollow V-shaped abutment or deflector 30. A horizontal partition 32 preferably of porous material extends across the top part of the sleeve valve in downwardly or inwardly-spaced relation to the end wall and on either side of the deflector 30. The partition 32 serves to exclude dirt from the vents 34 and 35 formed through base portions of the deflector 30 for a purpose later to be made apparent. The vents 34 and 35 open into the space 31 inwardly of the deflector 30 and outwardly of the partition 32.

Figure 2:
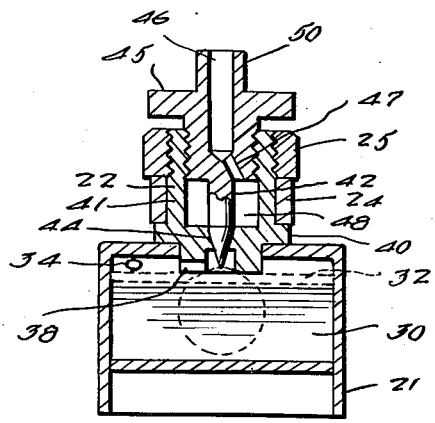
Figure 2 is a cross-sectional view taken along the line 2—2 of Figure 1, looking in the direction indicated by the arrows.
Figure 3:
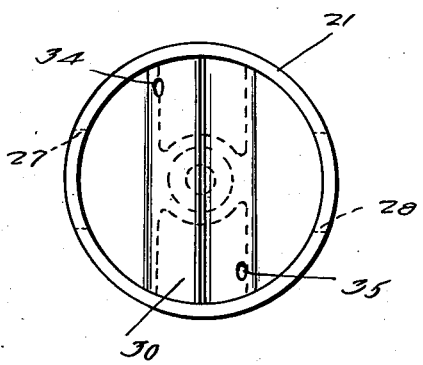
Figure 3 is a bottom view of the rotary sleeve valve of the trap.

The valve stem 22, as will best be seen in Figure 2, is of hollow construction, having a tubular portion 41 extending through the top of the sleeve 21. A vent 38 is provided in the tubular portion 41. A flange 40 formed on the stem 22 rests upon the top of the sleeve 21.

Within the tubular portion 41 of the stem 22 rising above the flange 40 there is arranged a needle valve 42 seating in a valve seat 44. The needle valve is adjustable by a thumb nut 45. This nut 45 has a central bore 46 opening by a port 47 into a chamber 48 in the stem 22.

The nut 45 has an extension 50 at its upper end to which may be connected any suitable detachable drain tube, such as a piece of rubber tubing, not shown.

The sludge trap is seen in its operating condition in Figure 1. The circulating fluid flows through the pipe section 1 into the trap through tubular extension 3 and port 4. The fluid must then flow downwardly under deflector 30 into receptacle 15 thence outwardly through port 28, and pipe section 2. Any dirt, sludge or other foreign matter capable of settling out of the fluid will thus be retained in the receptacle 15, which is preferably of transparent material so that it will be apparent when the same is in need of emptying.

When it is desired to empty the receptacle 15, the valve 21 is rotated by means of the lever 24 to move ports 27 and 28 out of register with the tubular extensions 3 and 4, thus closing the valve and shutting off the flow of fluid through the pipe sections 1 and 2. The receptacle 15 can then be removed by releasing the retainer 16 and unscrewing the receptacle from cap 10. It will be apparent that in this way there will be no loss of fluid from the circulating system by the removal of the sludge receptacle for cleaning.

When the receptacle 15 has been replaced, the needle valve 42 may be opened, and air trapped in the sludge trap will be permitted to escape as the circulating fluid flows into the receptacle 15 upon opening valve 21. Thus, the air passes through partition 32, which may be of some suitable porous material, through the ports 34 and 35, and through port 38 into chamber 48 of the valve stem 22. From the chamber 48 the air may pass through port 47 and out through the bore 46 of nut 45. When all air has escaped from the trap, valve 42 is closed to prevent escape of circulating fluid.

If it is desired to drain off circulating fluid from the system, a rubber tube may be attached to the extension 50 on nut 45 and the valve 42 opened. Circulating fluid will then follow the same path as just described for the escape of air from the trap. In this way fluid, such as antifreeze, can be drained off from the hot water heater of an automobile and will be filtered or strained by the porous material of the partition 32 as it is drained off.

It will thus be seen that the invention provides a simple and efficient sludge trap capable of application to any type of fluid circulating system, wherein foreign matter is likely to be found which can be removed by settling.

It will, of course, be understood that the above-described embodiment of the invention is given by way of example only, and that many changes can be made in the design of the apparatus and the structure and arrangement of the parts. Consequently, I do not limit myself to the precise structure shown and described, except as hereinafter claimed.

Having thus clearly shown and described the invention, what is claimed and desired to secure by Letters Patent is:

1. In a sludge trap or the like for a fluid conduit, the combination with a fitting including a tubular portion adapted to be interposed between the aligned open ends of a fluid conduit transversely thereof, aligned apertures in said fitting adapted to be aligned with said open ends of said conduit, an end wall closing one end of said fitting, the other end of said fitting being open, and a sludge trap detachably connected to said open end; of a tubular sleeve valve rotatably mounted within said fitting and concentric thereto, said valve having an end wall closing one end, the other end of said valve being open, said open end of said valve opening through said open end of said fitting, aligned inlet and outlet ports in said valve, means for rotating said valve in said fitting to move said ports into and out of alignment with said apertures of said fitting to open and close said valve, a partition of porous material extending across said valve in inwardly-spaced relation to the end wall thereof, air vents formed through said end walls of said valve and fitting, and means for opening and closing one of said vents.

2. In a sludge trap or the like for a fluid conduit, the combination with a fitting including a tubular portion adapted to be interposed between aligned open ends of a fluid conduit transversely thereof, aligned apertures in said fitting adapted to be aligned with said open ends of said conduit, an end wall closing one end of said fitting, the other end of said fitting being open, and a sludge trap detachably connected to said open end; of a tubular sleeve valve rotatably mounted within said fitting and concentric thereto, said valve having an end wall closing one end, the other end of said valve being open, said open end of said valve opening through said open end of said fitting, aligned inlet and outlet ports in said valve, means for rotating said valve in said fitting to move said ports into and out of alignment with said apertures of said fitting to open and close said valve, a partition of porous material extending across said valve in inwardly-spaced relation to the end wall thereof, air vents formed through said end walls of valve and fitting, said end wall of said valve having an inwardly-directed portion comprising a hollow deflector extending axially inwardly of said valve toward said open end between said ports, said deflector extending through said partition, said air vent of said valve being formed through a base portion of said deflector, and means for opening and closing said vent of said fitting.

ROBERT S. HENRY.

REFERENCES CITED

The following references are of record in the file of this patent:

UNITED STATES PATENTS

| Number | Name | Date |
| --- | --- | --- |
| 825,807 | Clarke | July 10, 1906 |
| 1,623,437 | Pohle | Apr. 5, 1927 |
| 1,992,472 | Craig | Feb. 26, 1935 |
| 2,050,091 | Gibson et al. | Aug. 4, 1936 |

FOREIGN PATENTS

| Number | Country | Date |
| --- | --- | --- |
| 4,417 | Great Britain | 1906 |